Feb. 19, 1963 F. RUSCHE 3,077,904
HOSE PLUG
Filed May 29, 1961
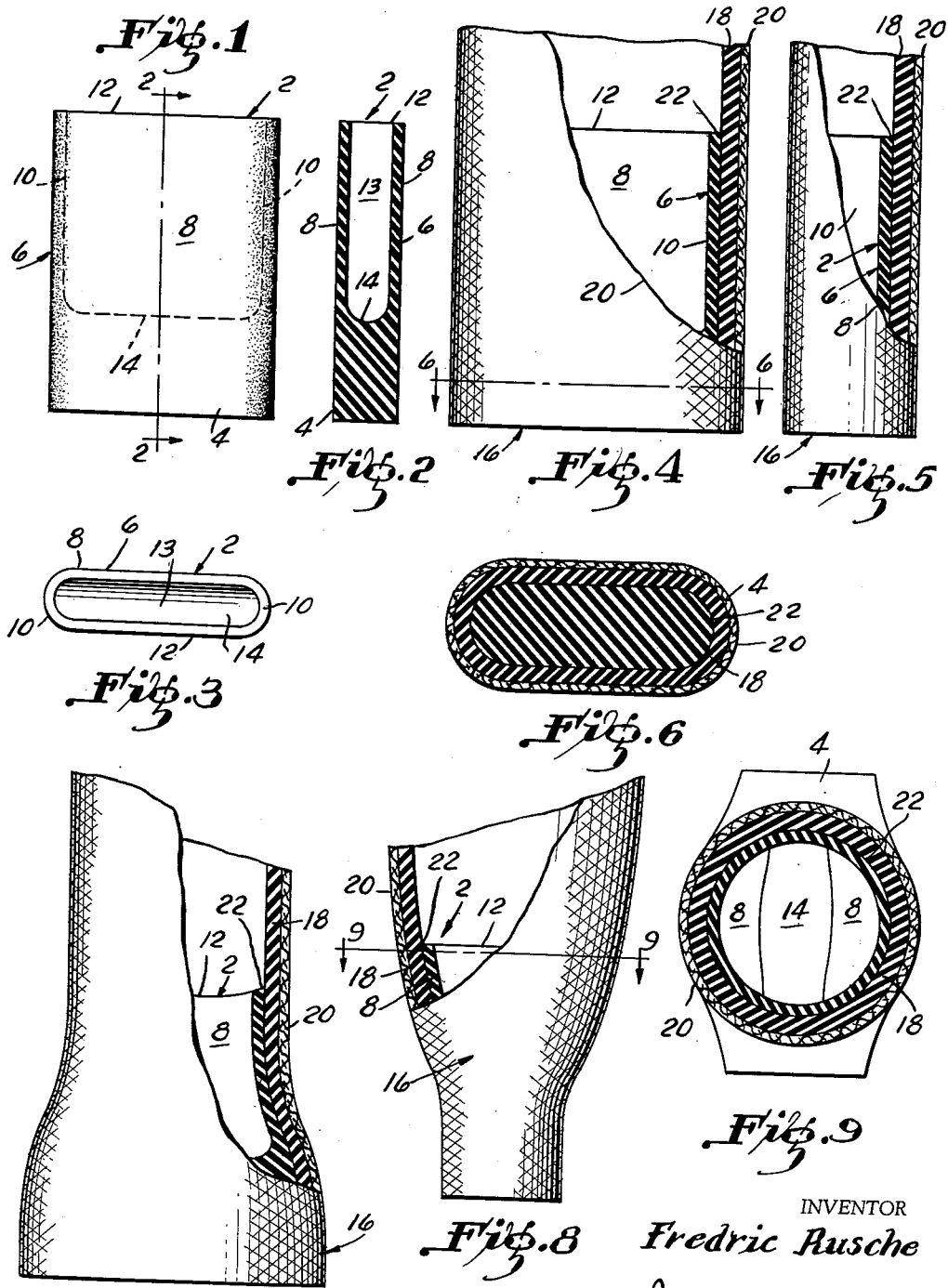
INVENTOR
Fredric Rusche
BY
James H Littlepage
ATTORNEY

United States Patent Office 3,077,904
Patented Feb. 19, 1963

3,077,904
HOSE PLUG
Fredric Rusche, 8125 Medina St., Detroit, Mich.
Filed May 29, 1961, Ser. No. 113,465
7 Claims. (Cl. 138—89)

This invention relates to plugs for closing the ends of flexible tubes subjected to high internal pressure and, more particularly, to a plug for closing the end of a hose which is of generally flat cross-section in collopsed condition and round in expanded condition.

One of the uses for reinforced flexible tubing, such as fire hose, is as an expansible member for actuating machine parts. For example, in an expandable mandrel for driving pile shells, lengths of fire hose are installed lengthwise within the mandrel to force the leaves or lugs of the mandrel outwardly against the inner side of the shell. The hose stock has a flexible tubular wall, usually of eoprene or the like rubbery material, reinforced by an outer sleeve of woven fabric. Hoses of this type will usually withstand internal pressure of 400 or more pounds per square inch, and a particularly fortuitous characteristic is that, when collapsed, they become quite flat. It is thus possible to force the leaves or lugs of a mandrel inwardly so as to clear the pile shell when the pressure fluid, such as compressed air, is released. When compressed air is let into the ends of the hoses, usually the top ends, they become round and, in so doing, force the leaves or lugs outwardly.

Where relatively low internal pressures are applied to the hoses, it is relatively easy to close and seal their ends by applying clamps over doubled-over ends, or by cementing or vulcanizing a solid plug into the end. However, when higher internal pressures of 50 pounds or more per square inch are applied, the crack where the opposite sides of a doubled-over hose end are brought together is the point where the air, acting almost like a wedge, splits the end seal apart and starts a tear in hose. When a solid plug is cemented into the hose end, even though the plug be as oversized as is possible, and even though the hose be pre-stretched as much as possible in order to admit the plug, the hose wall tends to expand away from the plug at the inner end of the plug. The compressed air, finding even a minute weakening or tendency of the hose wall to tear away from the plug at a single point at the edge of the joint between the plug and the hose, will rip its way through and split the joint apart.

The object now is to provide a hose-end plug of stretchable material having a thin walled cup-shape inner end, wherein the wall of the cup is less resistant to stretch than the hose wall so that the wall of the cup expands outwardly against the inner side of the hose. In contrast with prior expanding plugs having conical recesses in their inner ends, the object now is to provide a deep cup wall of generally uniform cross section from the lip of the cup nearly to the bottom of the open end so as to obtain an extended surface contact of substantially uniform outward pressure between the outer side of the plug and the inner side of the hose for almost the entire depth of the open portion of the cup.

Another object of the invention is the provision of a normally flat cup-shape plug having an open inner end which, when the normally flat hose in which it is engaged is expanded, becomes round so as to conform to the then-round shape of the hose. The plug may thus be accommodated in the same amount of flat space as the hose when the latter is flat.

These and other objects will be apparent from the following specification and drawing, in which:

FIG. 1 is a side elevation of the plug;

FIG. 2 is a vertical cross-section along the line 2—2 of FIG. 1;

FIG. 3 is a plan view of the plug;

FIG. 4 is a side elevation, partly broken away, showing the plug installed in the end of a hose, with the latter collapsed;

FIG. 5 is an end elevation, partly broken away, of the installation as shown in FIG. 4;

FIG. 6 is a cross-section along the line 5—5 of FIG. 4, looking in the direction of the arrows;

FIG. 7 is a view similar to FIG. 4, but showing the condition of the plug and hose when the hose is inflated;

FIG. 8 is a side elevation, partly broken away, also showing the condition of the parts when the hose is inflated; and, FIG. 9 is transverse cross-section along the line 9—9 of FIG. 8, looking in the direction of the arrows.

Referring now to the drawing, in which like reference numerals denote similar elements, FIGS. 1–3 show the hose plug 2 alone. Plug 2, being generally flat, is made of neoprene or the like rubbery material, and provided with a solid outer end 4 contiguous and integral with a cup-shape inner end 6 having relatively thin side and end walls 8 and 10, respectively, terminating at their free edges in a lip 12. The bottom 14 of the deep recess 13 of cup-shape end 6 is rounded, or fileted to prevent the side and end walls from tearing away from the solid bottom when internal pressure is applied.

Plug 2 is devised for insertion in the end of a conventional hose 16, such as a fire hose having a neoprene tubular wall 18 surrounded by a fabric outer sleeve 20. Epoxy resin 22 is used to bond the entire outer side of the plug to the inner side of the hose.

The neoprene from which plug 2 is formed is less resistant to stretch than the neoprene 18 in the hose. In addition, the side and end walls 8 and 10 of the plug are considerably thinner than the inner wall 18 of the hose. Consequently, when internal fluid pressure is applied to the hose so that it becomes round, as shown in FIGS. 7–9, almost all of cup-shape end 6 of the plug becomes round, and the side walls of the plug are compressed outwardly against the neoprene hose wall 18 which is outwardly confined by fabric sleeve 20. The solid end 4 of the plug remains flat, as does the end of the hose which is bonded to it. When the internal pressure is released, both the hose and plug resume their original flatness as illustrated in FIGS. 4–6.

Plugs of the type disclosed have proved capable of withstanding internal pressures of over 250 pounds per square inch without failure, thus providing a safety factor of over 5 to 1 for hose pressures of 50 pounds per square inch. When tested to destruction with internal pressures exceeding 300 pounds per square inch, failure occurs by blow-out through the solid end 4 of the plug, rather than between the outer side of the plug and the inner side of the hose.

It will be understood by those skilled in the art that stretchable elastic rubbery materials other than neoprene may be used for the plug, and the plug may be used with hoses or flexible tubes other than the kind disclosed by way of example.

I claim:

1. A hose closure plug comprising a unitary substantially flat body of stretchable elastic material, said body having opposite end portions, one of said end portions being solid, the other end portion having an open-ended recess therein and being capable of expansion towards a generally cylindrical configuration when subjected to internal fluid pressure.

2. A hose closure plug as claimed in claim 1, said recess having a rounded bottom.

3. A closure plug for flat collapsible hose which comprises an inner tube of stretchable elastic material surrounded by a fabric reinforcing sleeve, said hose assuming a round cross-sectional shape when subjected to internal fluid pressure, said plug comprising a generally flat unitary body of stretchable elastic material having an outer surface adapted for close engagement against the inner surface of said tube, an outer end portion adapted to be disposed towards an end of the hose, and an inner end portion adapted to project inwardly from said hose end, said outer end portion being solid, said inner end portion having an open-ended cavity extending lengthwise therein from the inner end of the plug to the outer end portion of the plug body and being capable of expansion towards a generally cylindrical configuration when subjected to internal fluid pressure.

4. A closure plug for a flat collapsible hose which comprises an inner tube of stretchable elastic material surrounded by a fabric reinforcing sleeve, said hose assuming a round cross-sectional shape when subjected to internal fluid pressure, said plug comprising a generally flat unitary body of stretchable elastic material having an outer surface adapted for close engagement against the inner surface of said tube, an outer end portion adapted to be disposed towards an end of the hose, and an inner end portion adapted to project inwardly from said hose end, said outer end portion being solid, said inner end portion having an open-ended cavity extending lengthwise therein from the inner end of the plug to the outer end portion of the plug body and being capable of expansion towards a generally cylindrical configuration when subjected to internal fluid pressure, the side wall of said inner portion lying between the cavity and the outer surface of the plug being less resistant to stretch than the inner tube of the hose.

5. In combination, a flat collapsible hose which comprises an inner tube of stretchable elastic material surrounded by a fabric reinforcing sleeve, said hose assuming a round cross-sectional shape when subjected to internal fluid pressure, a closure plug comprising a generally flat unitary body of stretchable elastic material having an outer surface closely engaging the inner surface of said tube, resin forming a bond between the outer surface of the plug and the inner surface of the tube, said plug having an outer end portion disposed towards an end of the hose, and an inner end portion projecting inwardly from said hose end, said outer end portion being solid, said inner end portion having an open-ended cavity extending lengthwise therein from the inner end of the plug to the outer end portion of the plug body and being capable of expansion towards a generally cylindrical configuration in response to internal fluid pressure.

6. In combination, a flat collapsible hose which comprises an inner tube of stretchable elastic material surrounded by a fabric reinforcing sleeve, said hose assuming a round cross-sectional shape when subjected to internal fluid pressure, a closure plug comprising a unitary body of stretchable elastic material having an outer surface closely engaging the inner surface of said tube, resin forming a bond between the outer surface of the plug and the inner surface of the tube, said plug having an outer end portion disposed towards an end of the hose, and an inner end portion projecting inwardly from said hose end, said outer end portion being solid, said inner end portion having an open-ended cavity extending lengthwise therein from the inner end of the plug to the outer end portion of the plug body, the side wall of said inner portion lying between the cavity and the outer surface of the plug being less resistant to stretch than the inner tube of the hose.

7. In combination, a flat collapsible hose which comprises an inner tube of stretchable elastic material surrounded by a fabric reinforcing sleeve, said hose assuming a round cross-sectional shape when subjected to internal fluid pressure, a closure plug comprising a unitary body of stretchable elastic material having an outer surface closely engaging the inner surface of said tube, resin forming a bond between the outer surface of the plug and the inner surface of the tube, said plug having an outer end portion disposed towards an end of the hose, and an inner end portion projecting inwardly from said hose end, said outer end portion being solid and of generally flat oblong shape, said inner end portion having an open-ended cavity extending lengthwise therein from the inner end of the plug and bottoming in the outer end portion of the plug body and being capable of expansion towards a generally cylindrical shape in response to internal fluid pressure, the bottom of the recess being rounded, the side wall of said inner portion lying between the cavity and the outer surface of the plug being of substantially uniform thickness from the open end of the recess substantially to the bottom thereof.

References Cited in the file of this patent

UNITED STATES PATENTS

| | | |
|---|---|---|
| 2,072,518 | Brown | Mar. 2, 1937 |
| 2,145,705 | Wodtke | Jan. 31, 1939 |
| 2,276,443 | Wilson | Mar. 17, 1942 |
| 2,536,431 | Endsley | Jan. 2, 1951 |
| 2,644,978 | Becker | July 14, 1953 |
| 2,733,060 | Taylor | Jan. 31, 1956 |